United States Patent [19]
Ullrich et al.

[11] 3,741,272
[45] June 26, 1973

[54] PROCESS FOR THE PRODUCTION OF SPONTANEOUSLY CROSS-LINKING HIGHLY REACTIVE POWER LACQUER BINDERS

[75] Inventors: Martin Ullrich, Leverkusen; Rudolf Erdmenger, Bergisch-Gladbach; Heinrich Kunze, Koeln; Karl Nöthen, Leverkusen; Hansgünter Appel, Bergisch-Gladbach; Frank Wingler, all of Farbenfabriken Bayer Aktiengesellschaft, Leverkusen, all of Germany

[73] Assignee: Bayer Aktiengesellschaft, Leverkusen, Germany

[22] Filed: Jan. 28, 1971

[21] Appl. No.: 110,696

[30] Foreign Application Priority Data
Mar. 7, 1970  Germany.................. P 20 05 691.1

[52] U.S. Cl............ 159/2 E, 159/49, 159/DIG. 10, 260/31.2 N, 260/32.8, 260/33.8, 260/80.73, 260/80.81, 260/86.1 E
[51] Int. Cl...... B01d 1/28, B01d 1/22, C08c 11/36, C08c 11/24, C08f 15/40, C08g 51/36
[58] Field of Search............................ 264/102, 176; 159/2 E, DIG. 10, 49, 13 R; 260/DIG. 22, 31.2 N, 32.8, 33.8, 80.73, 80.81, 86.1 E

[56] References Cited
UNITED STATES PATENTS

| 3,474,061 | 10/1969 | Bonin et al. | 260/29.6 |
| 3,118,744 | 1/1964 | Erdmenger et al. | 159/2 E |
| 3,244,688 | 4/1966 | Goins | 260/96 R |
| 3,388,196 | 6/1968 | Farrell | 264/176 R |
| 3,350,336 | 10/1967 | Kelley | 260/31.2 N |
| 3,487,031 | 12/1969 | Muroi et al. | 260/31.2 N |

FOREIGN PATENTS OR APPLICATIONS
1,083,798  9/1967  Great Britain ...................... 159/2 E

*Primary Examiner*—Norman Yudkoff
*Assistant Examiner*—J. Sofer
*Attorney*—Connolly and Hutz

[57] ABSTRACT

Solvent-free spontaneously cross-linking highly reactive acrylic resins being crosslinkable through N-methylolether groups for powder coatings with a softening point of from 75° – 110° C are obtained from their solutions by continuous concentration through evaporation in a self-cleaning screw evaporator in which the residence times are from 2 to 6 minutes, the resin being heated both through external heating and through internal friction to a temperature not exceeding 120° C.

7 Claims, 3 Drawing Figures

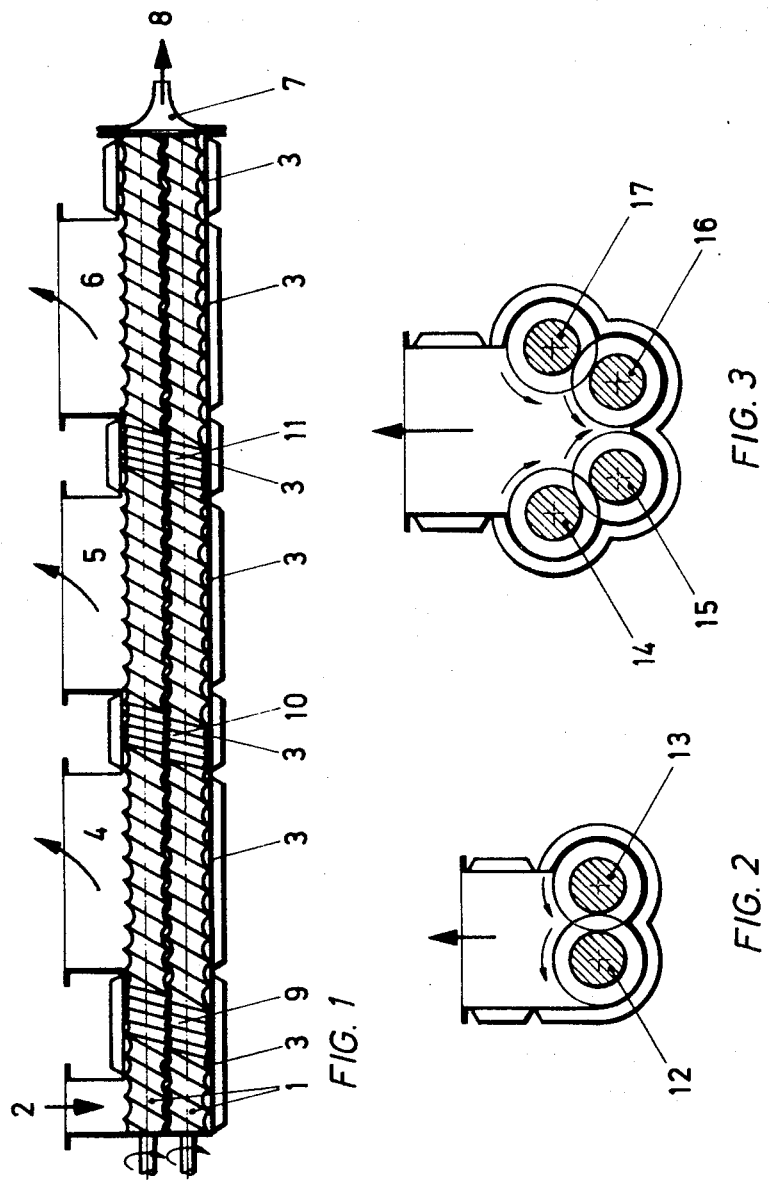
INVENTORS:
MARTIN ULLRICH, RUDOLF ERDMENGER, HEINRICH KUNZE, KARL NÖTHEN,
HANSGÜNTER APPEL, FRANK WINGLER.

PROCESS FOR THE PRODUCTION OF SPONTANEOUSLY CROSS-LINKING HIGHLY REACTIVE POWER LACQUER BINDERS

This invention relates to a process for the production of spontaneously crosslinking highly reactive powder lacquer binders, especially based on alkoxy methyl isocyanate-modified, hydroxyl-group-containing polyacrylates with free hydroxyl groups.

Spontaneously crosslinking, i.e., single-component binders, are of particular interest for electrostatic powder spraying and fluidization dip-coating because there is no danger in their case of the synthetic resin and crosslinker component disintegrating during transportation, storage and application in spray guns or fluidized beds, with the result that no irregular crosslinking can occur during stoving. Practical requirements imposed with a view to making the process for lacquering with solvent-free binders more economical by reducing the stoving temperatures and shortening the stoving times can largely be satisfied according to one of our own earlier Belgian Pat. No. 743,931 through the development of highly reactive single-component systems based on alkoxy-methyl isocyanate-modified, hydroxyl-group-containing polyacrylates with free hydroxyl groups.

In comparison with polyacrylate powders which are stoved at temperatures above 150° C, being crosslinkable through acryl amide or methacrylamide-N-methylol ethers, alkoxy methyl isocyanate-modified, hydroxyl-group-containing polyacrylates with free hydroxyl groups begin to crosslink at temperatures as low as 120° C. Unfortunately, this practical advantage presents certain difficulties in regard to working up the polymers prepared in solution and modified with alkoxymethyl isocyanates.

Several processes have been proposed for separating off the solvents from solutions of spontaneously crosslinking synthetic resins. In cases where the spontaneously cross-linking polymer is prepared in water-miscible solvents, it can be isolated by precipitation with water. Although in this process the product is not exposed to any thermal strain, the long drying times required in view of the low temperatures and the high consumption of washing water attributable to the unfavorable distribution coefficient of the solvent between polymer and water, represent serious disadvantages. In addition, long washing times are required to obtain the polymer in a solvent-free form because the solvent has to be diffused from the solid phase into the water at low temperatures. Furthermore, considerable outlay is involved in separating a mixture of a little solvent in a lot of water by distillation with a view to recovering the solvent.

In cases where the polymer solutions in organic solvents are worked up by spray drying, the solvent is much easier to recover. However, since the sintering points of the polymers still containing a little solvent are in the vicinity of the evaporation point of the solvent, the spray dryer soon becomes fouled with blockages which make this process impracticable.

Another method of isolating the polymers from organic solvents is to remove the solvent by azeotropic distillation with water in vacuo, followed by drying of the polymer. Although the amount of water required in this process is lower than that required in the water precipitation process referred to earlier on, the disadvantages of long drying times at low temperature and expensive recovery of the solvent from the water-solvent mixture are still very much in evidence.

Processes for concentrating solutions of high molecular weight substances with screw evaporators are also known (cf. German Pat. specification No. 1,111,154). Unfortunately, these processes are only suitable for working up non-reactive or substantially non-reactive powder lacquer binders. The problem involved in directly evaporating solutions of highly reactive synthetic resins which, as in the present case, begin to crosslink at temperatures as low as 120°C for softening points in a range from 75° to 110°C, is that evaporation of most of the solvent from a viscous solution, i.e., a basically long and involved diffusion process, has here to be carried out within extremely narrow temperature limits and with short residence times. The opposing requirements which have to be satisfied, i.e., on the one hand substantial freedom from residual solvent, i.e., non-tacky synthetic resin powders, and on the other hand no crosslinking at this stage, cannot be satisfied by using conventional screw evaporation techniques.

The process according to the invention for the production of spontaneously crosslinking highly reactive powder lacquer binders provides a solution to this problem.

Accordingly, the present invention relates to a process for the production of solvent-free, spontaneously crosslinking highly reactive acrylic resins for powder coatings with a softening point of from 75° to 110°C which begin to crosslink at temperatures around 120°C, from solutions by continuous concentration through evaporation, optionally under reduced pressure, distinguished by the fact that the resin solution is concentrated through evaporation in a self-cleaning screw evaporator in which the residence times are from 2 to 6 minutes, the resin being heated both through external heating and through internal friction to temperatures not exceeding 120°C, and preferably not exceeding 100° to 110°C.

In the context of this invention, highly reactive spontaneously crosslinking acrylic resins are reaction products of copolymers of hydroxyl-group-containing monomers, alkyl esters of $\alpha,\beta$-unsaturated carboxylic acids with three to five carbon atoms and optionally other non-functional monomers with $C_1$ to $C_{18}$ alkoxymethyl isocyanates, preferably methoxymethyl isocyanate.

It is preferred to use acrylic resins of copolymers of
A. 5 – 80 percent by weight of at least one monomer containing hydroxyl groups,
B. 20 – 95 percent by weight of at least one ester of $\alpha,\beta$-unsaturated carboxylic acids with three to five carbon atoms
C. 0 – 70 percent by weight of at least one non-functional comonomer
D. 0 – 15 percent by weight of optionally N-monoalkylated acrylic or methacrylic acid amide and
E. 0 – 5 percent by weight of free $\alpha,\beta$-unsaturated carboxylic acids with three to five carbon atoms
(total sum of the percentages 100), the copolymer being reacted with 0.1 to 30 percent by weight of methoxymethyl isocyanate, based on solid copolymer.

The following are examples of group (A) monomers : hydroxymethyl norbornene, dihydroxymethyl norbornene, phenylallyl alcohol, hydroxyalkyl esters of acrylic acid and methacrylic acid, such as acrylic acid or methacrylic acid hydroxyethyl ester, β-hydroxypropyl ester and hydroxybutyl ester, in which case the hydroxyl group can be attached to a primary or secondary carbon atom; hydroxyalkyl esters of fumaric or maleic acids such as fumaric acid dihydroxyethyl ester, fumaric acid monohydroxyethyl ester, fumaric acid hydroxyethyl ethyl ester, trimethylol-propane monoallyl ether and glycol monovinyl ether.

Examples of group (B) monomers include esters of α,β-unsaturated carboxylic acids of three to five carbon atoms and with one to 12 carbon atoms in the esteralkyl radical such as acrylic acid or methacrylic acid methyl ester, ethyl ester, cyclohexyl ester and branched and linear esters of propanol, butanol and octanol.

Examples of group (C) monomers include styrene, α-methyl styrene, vinyl toluene, acrylonitrile, vinyl acetate, methacrylonitrile, α,chloroacrylonitrile and vinylidene. chloride.

Group (D) monomers include inter alia optionally N-monoalkylated acrylamide or methacrylamide or for example N-vinyl acetamide and diacetone acrylamide.

Examples of group (E) monomers include α,β-unsaturated carboxylic acids with three to five carbon atoms such as acrylic acid or methacrylic acid.

Polymerization can be carried out in known manner with initiators decomposing into radicals such as peroxides or azo compounds, solvents inert to isocyanates such as methylene chloride, chloroform, acetone, toluene and methyl glycol acetate. The solution is then reacted at temperatures of up to about 50°C with 0.1 to 30 percent by weight and preferably from 5 to 20 percent by weight of alkoxymethyl isocyanate, based on solid polymer. Suitable alkoxymethyl isocyanates include predominantly $C_1 - C_{18}$ alkoxymethyl isocyanates of any kind, in particular methoxymethyl isocyanate, ethoxymethyl isocyanate, isopropoxymethyl isocyanate, butoxymethyl isocyanate, hexoxymethyl isocyanate and allyloxymethyl isocyanate.

The solvents in which the highly reactive acrylic resins are dissolved have boiling points below about 140°C at normal pressure.

The acrylic resins are preferably dissolved in low boiling organic solvents such as methylene chloride, methyl acetate, ethyl acetate and acetone.

The acrylic solutions to be worked up in accordance with the invention can contain pigments, catalysts, levelling agents, fillers, dissolved dyes and other additives of the kind normally used in the lacquer industry.

The solutions may contain as pigments for example white and colored pigments, for example titanium dioxide, iron oxide, chrome yellow, prussian blue, brunswick green, zinc or lead chromate, tinted titanium pigments, zinc sulphide pigments, lithopones, organic pigments such as phthalocyanide pigments or insoluble azo dyes.

Suitable fillers include precipitated or pyrogenically obtained silicas, also silicates, quartz powder, glass powder and, to obtain special effects, metal powders such as aluminum and copper bronzes.

The resin solution optionally containing pigments, fillers, levelling agents and other additives is worked up in special screw evaporators under special process conditions.

Screw evaporators (cf. FIG. FIG. 1), are continuous-cycle evaporators equipped with one or more feed screws or kneading screws 1 in which viscous solutions, melts or suspensions of usually high molecular weight substances are concentrated through the evaporation of volatile constituents down to extremely low tolerable residual contents. The solution to be concentrated through evaporation is fed into the screw evaporator at 2 by means of conventional metering pumps, for example by means of gear pumps. The heat required for evaporation is supplied to the viscous solution both thermally through the heated walls 3 of the apparatus and mechanically through the rotating screw shafts 1 as a result of friction in the material. In the case of relatively large machines, the screw shafts 1 can also be heated. The housing surrounding the screw shafts is opened in zones 4,5,6 to allow the vapors to escape. Solvent vapors are given off, optionally in vacuo, from the heated continually freshly exposed layers of material, and removed in these evaporation zones 4,5,6. These vapors are then condensed in known manner to recover the solvent. The solvent-free highly viscous melt is removed at 8 through a nozzle 7.

It is only possible directly to concentrate solutions of the aforementioned highly reactive substances through evaporation in screw evaporators on condition that the temperature-sensitive material is subjected to thermal stressing for only a very short period, especially with a narrow residence time spectrum. Accordingly, the process according to the invention is preferably carried out in positive-feed, self-cleaning, multiple-shaft screw machines in which the screw shafts scrape one another and in which the residence time distribution is narrow.

Two such screw systems are shown by way of example in FIGS. 2 and 3 in secton through the evaporation zone, FIG. 2 shows a preferably used two-shaft system with screw shafts 12, 13 rotating in the same direction and scraping one another, while FIG. 3 shows a preferably used four-shaft system consisting of two self-cleaning pairs of screws of the kind shown in FIG. 2 which, installed in the form of a V in the widely opened evaporation housing, form an arrangement which is particularly favorable for evaporation purposes. The four-screw shafts 14,15,16,17, as seen in the evaporation housing, then preferably rotates inwards and downwards as shown in FIG. 3.

In order to prevent the highly reactive substances from being thermally stressed, the process according to the invention is preferably carried out with low-boiling solvents, for example with methylene chloride, methyl acetate or ethyl acetate. These solvents enable highly reactive lacquer binder to be isolated from the solution at heating temperatures of the screw evaporator or from 50° to 100°C, and maximum product temperatures at the melt-outlet end of the machine of 120°C, preferably 100° to 110°C, for residence times of the product of from 2 to 6 minutes, preferably from 3.5 to 4 minutes, during the heating from 20° to 120°C, preferably 100° to 110°C, and at pressures in the evaporation zones of from 10 to 300 Torr. Although the aforementioned substances only begin to crosslink at temperatures around 110°C, the screw evaporator should only be heated to 100°C because the solution is additionally heated through friction within the material and, due to this mechanical heating, the lacquer melt ultimately leaves the machine with a temperature of up to 120°C. Accordingly, the screw evaporator is heated to temperatures some 10° to 60°C below the required maximum melt product through the drive of the screw shafts is governed by the viscosity of the melt, by the screw arrangement, by the geometry of the screws (diameter, length and radial clearance between the screws and the housing) and by the rotational speed of the screws. Accordingly, for a given product system and for a given screw evaporator, the heat generated mechanically in the melt can only be controlled through the rotational speed of the screw. On the other hand, the residence time of the melt in the screw evaporator is also governed by the rotational speed of the screws. Although any reduction in rotational speed also reduces the extent to which the melt is mechanically heated, it increases the residence time. A compromise between these opposing influences is found with the aforementioned data. In addition, the problems referred to earlier on are solved by these process data inter alia characterizing the invention: on the one hand, the highly reactive substances are not crosslinked at temperatures above the softening point of from 75° to 110°C but below 120°C; on the other hand, the solvents are removed to such an extent (leaving the melt with tolerable residues of less than 0.5 percent) that the highly reactive synthetic resins obtained do not show any signs of tackiness during further processing.

The process according to the invention can only be carried out successfully if heating of the screw evaporator can be adjusted with precision. To this end, a liquid heat-transfer agent, for example warm water that can be tempered with precision, can be effectively used for this purpose.

The resin solution to be processed can with advantage be concentrated by flash evaporation before it enters the screw evaporator.

The evaporation process in the screw machine is preferably divided into several stages 4,5,6 with falling pressures. The closure between one stage and the next is formed through the local accumulation of material in the bores of the various partitions. Screw parts 9, 10, 11 for example with sudden changes in the thread of the screw are used for this purpose.

One of the advantages of the invention is that the solvents can readily be recovered by condensing the vapors, and then re-used. The low-boiling solvents referred to above are preferably used. High-boiling solvents can only be used in cases where the reactivity of the spontaneously crosslinking powder lacquer binder allows.

According to another aspect of the invention, the binder solution to be concentrated can have a stabilizer such as an amine or alcohol added to it before or during concentration in the screw evaporator.

The viscous melt of the highly reactive lacquer binder discharged from the screw evaporator has to be quickly cooled to prevent premature crosslinking. This is done for example by cold air, or in water or other liquids, optionally in conjunction with a cutting granulator. The solidified products are readily grindable and are further processed in known manner into electrostatically sprayable powders or fluidization dipcoating powders which are applied and stoved by the usual methods.

The percentages in the following Examples are percentages by weight unless otherwise stated.

PREPARATION OF THE ACRYLATE RESINS USED IN THE EXAMPLES 9.8 parts by weight of methylene chloride are introduced under nitrogen into an autoclave and heated to 85°C. A mixture of 10 parts by weight of styrene, 4 parts by weight of methacrylic acid hydroxypropyl ester and 6 parts by weight of butyl acrylate and at the same time a solution of 0.3 part by weight of azodiisobutyronitrile in 1 part by weight of methylene chloride are then pumped in over a period of 5 hours. The pressure is kept at 4 atms. and the temperature at 85°C. The mixture is cooled to 70°C and a solution of 0.1 part by weight of azodiisobutyronitrile in 1 part by weight of methylene chloride is stirred into it. Polymerization is continued for 5 hours, after which the reaction mixture is cooled to 60°C. 0.005 part by weight of tin dioctoate and 1.6 parts by weight of methoxymethyl isocyanate are added. The mixture is stirred at 60°C until the isocyanate band in the infra-red spectrum disappears, after which 1.2 parts by weight of methanol are stirred in. The approximately 65 percent resin solution is concentrated through evaporation in a screw machine.

Preparation in methyl acetate is carried out as described above except that methyl acetate is used instead of methylene chloride. Ethyl acetate solutions are obtained by using ethyl acetate instead of methylene chloride and replacing the azobutyronitrile by equivalent parts by weight of tert. butyl peroctoate. Solutions of the copolymers in toluene can also be similarly obtained.

Instead of methanol, 0.01 to 2 parts by weight of an alcohol such as ethanol n-propanol, isobutanol or butyl glycol, or an amine such as triethylamine, ethanolamine or morpholine can be added as a stabilizer, and isophorone or silicone oil as levelling agents after reaction with methoxymethyl isocyanate. Anti-agers, ultra-violet absorbers, soluble dyes, pigments, fillers such as derivatives of silicic acid, matting agents, metal powders and elasticizing agents can be added to the lacquer solution before it is concentrated through evaporation.

EXAMPLE 1

A 65 percent solution in methylene chloride of an acrylic resin consisting of 50 percent by weight of styrene, 30 percent by weight of butyl acrylate and 20 percent by weight of methacrylic acid hydroxypropyl ester 60 mol percent of whose free OH groups have been converted with methoxymethyl isocyanate into the corresponding urethane, is continuously concentrated through evaporation following the addition of 6 percent by weight of methanol, based on the resin, in a two-shaft, 1.1 meters long, two-stage (first evaporation opening of 180 mm, second opening 500 mm long) screw evaporator with an external screw diameter of 32 mm and with self-cleaning screw shafts rotating in the same direction at 90 r.p.m. The solution is delivered by means of a gear pump into the screw evaporator at a temperature of 20°C, and concentrated through evaporation in the screw evaporator over an average residence time of 4 minutes under a vapor pressure of 75 Torr, the screw housing being heated with water at 70°C. The highly reactive powder lacquer binder isolated from the solution is discharged in the form of a viscous uncrosslinked melt at a temperature of 105°C and at a rate of 3.1 kg/hour, immediately cooled and solidified in cooled water, ground and then freed by drying from any surface water still present. The melt can also be cooled sufficiently quickly in the absence of water by blowing cold air on to the issuing melt.

EXAMPLE 2

As in Example 1, a 65 percent solution in methylene chloride of an acrylic resin of 40 percent by weight of styrene, 10 percent by weight of methacrylate, 30 percent by weight of butyl acrylate and 20 percent by weight of hydroxypropyl methacrylate (60 mol percent of the free OH groups are modified with methoxymethyl isocyanate) is concentrated through evaporation following the addition of 6 percent by weight of methanol (based on the resin) in the screw evaporator described in Example 1, in which the screw shafts rotate at 90 r.p.m., the heating temperature is 50°C, the vapor pressure is 60 Torr and the residence time is approximately 4 minutes. A viscous uncrosslinked lacquer binder melt with a temperature of 110°C is discharged at a rate of 2.6 kg per hour and further processed as in Example 1.

EXAMPLE 3

Following the addition of 6 percent of methanol (based on the resin), the resin of Example 1 in the form of a 65 percent solution in methyl acetate is isolated from the solution in the screw evaporator described in Example 1 in which the screw shafts rotate at 90 r.p.m. the heating temperature is 50°C, the vapor pressure is 25 Torr and the residence time is approximately 4 minutes. The viscous uncrosslinked resin melt is discharged with a temperature of 110°C at a rate of 2.7 kg/hour, and further processed as described in Example 1.

EXAMPLE 4

Following the addition of 6 percent by weight of methanol (based on the resin), the resin of Example 1 in the form of a 68 percent solution in ethyl acetate is isolated from the solution as in Example 1 in a screw extruder of the same kind, in which the screws rotate at 90 r.p.m., the heating temperature is 70°C, the vapor pressure is 50 Torr and the residence time approximately 4 minutes. The resin melt is discharged uncrosslinked with a temperature of 95°C and at a rate of 3.0 kg per hour, and further processed as in Example 1.

EXAMPLE 5

Following the addition of 0.6 percent by weight of triethylamine (based on the resin), the resin of Example 1 in the form of a 68 percent solution in ethyl acetate is isolated from the solution as described in Example 1 in a screw evaporator of the same kind, in which the screw shafts rotate at 90 r.p.m., the heating temperature is 70°C, the vapor pressure is 15 Torr and the residence time is approximately 4 minutes. The uncrosslinked resin melt leaves the screw evaporator with a temperature of 107°C and at a rate of 2.3 kg/hour, and is cooled and worked up as described in Example 1.

EXAMPLE 6

Following the addition of 6 percent by weight of methanol (based on the resin), a 60 percent solution of the resin of Example 1 in methylene chloride is continuously concentrated through evaporation in a four-shaft, 1.73 meters long, two-stage (first evaporation opening 550 mm, second opening 210 mm long) screw evaporator of the kind shown in FIG. 3 with an outer screw diameter of 50 mm and with self-cleaning screw shafts rotating at 80 r.p.m. The solution is delivered into the screw evaporator by means of a gear pump at a temperature of 20°C and concentrated through evaporation in the evaporator under a vapor pressure of 60 Torr over an average residence time of 3.5 minutes, the screw housing being heated with water at 87°C. A viscous, uncrosslinked lacquer binder melt with a temperature of 105°C is discharged at a rate of 23 kg/hour and further processed as in Example 1.

After the solution has been pre-heated to 47°C, the output rate of resin melt can be increased from 23 kg/hour to 40 kg/hour with the same starting solution and otherwise the same conditions by flash evaporation at 160 Torr in an apparatus immediately preceding the screw evaporator at 2, cf. FIG. 1.

The resins of Examples 1 to 6 isolated from their solutions are all soluble in commercial solvents such as xylene, ethyl acetate or methyl glycol acetate, i.e., uncrosslinked, and can be ground into a non-lumping, i.e., substantially solvent-free, powder with particle diameters of less than 80 $\mu$ and sinter temperatures around 100°C following application to a substrate to form a uniform film of high gloss which can be stoved at temperatures above 120° C.

We claim:

1. A process for producing solvent-free, spontaneously cross-linking, highly reactive acrylic resins which comprises passing a solvent solution of a resin having a softening point of from 75° to 100°C. and beginning to crosslink at a temperature of around 120°C. which is the reaction product of a copolymer of
   A. 5–80 percent by weight of at least one hydroxyalkyl ester of acrylic and methacrylic acids,
   B. 20–95 percent by weight of at least one member selected from the group consisting of alkyl esters of acrylic and methacrylic acids having one to 12 carbon atoms in the alkyl moiety and the cyclohexyl esters of acrylic and methacrylic acids,
   C. 0–70 percent by weight of styrene, acrylonitrile, vinyl acetate or a mixture thereof,
   D. 0–15 percent by weight of acrylamide or methacrylamide and
   E. 0–5 percent by weight of acrylic acid or methacrylic acid and from 0.1 to 30 percent by weight, based on the weight of said copolymer, of methoxymethylisocyanate through a self-cleaning screw evaporator at a rate obtaining a residence time therein of from 2 to 6 minutes while heating the resin by externally applied heat and through internal friction within said evaporator to a temperature between said softening point and up to 120°C. and rapidly cooling said resin as it is discharged from said evaporator.
2. The process of claim 1 wherein said resin is heated to a temperature of up to 110°C.
3. The process of claim 1 wherein said resin is heated to a temperature of up to 100°C.
4. The process of claim 1 wherein the pressure in said evaporator is below atmospheric pressure.
5. The process of claim 1 wherein said solvent has a boiling point of below 140°C. at normal pressure.
6. The process of claim 5 wherein said solvent is methylene chloride, methyl acetate, acetone or ethyl acetate.
7. The process of claim 1 wherein said solvent solution includes at least one pigment, filler, soluble dye, catalyst or levelling agent.

* * * * *